(12) United States Patent
Kan

(10) Patent No.: US 11,713,247 B2
(45) Date of Patent: Aug. 1, 2023

(54) METHOD FOR PREPARING ELECTRONIC GRADE SULFURIC ACID FROM WASTE SULFURIC ACID SOLUTION

(71) Applicants: GREEN FINE TECHNOLOGY CORP., Taoyuan (TW); GREEN ADVANCED TECHNOLOGY LTD., Taoyuan (TW)

(72) Inventor: Ching-Jung Kan, Taoyuan (TW)

(73) Assignees: GREEN FINE TECHNOLOGY CORP., Taoyuan (TW); GREEN ADVANCED TECHNOLOGY LTD., Taoyuan (TW)

( * ) Notice: Subject to any disclaimer, the term of this patent is extended or adjusted under 35 U.S.C. 154(b) by 0 days.

(21) Appl. No.: 17/736,785

(22) Filed: May 4, 2022

(65) Prior Publication Data
US 2022/0371890 A1 Nov. 24, 2022

(30) Foreign Application Priority Data

May 19, 2021 (TW) ................. 110118131

(51) Int. Cl.
*C01B 17/76* (2006.01)
*C01B 17/765* (2006.01)
*C01B 17/88* (2006.01)
*C01B 17/58* (2006.01)
*C01B 17/775* (2006.01)
*C01B 17/79* (2006.01)

(52) U.S. Cl.
CPC .......... *C01B 17/7655* (2013.01); *C01B 17/58* (2013.01); *C01B 17/775* (2013.01); *C01B 17/79* (2013.01); *C01B 17/88* (2013.01)

(58) Field of Classification Search
None
See application file for complete search history.

(56) References Cited

U.S. PATENT DOCUMENTS

2004/0211464 A1* 10/2004 Inagaki ................. C01B 17/88
137/93

FOREIGN PATENT DOCUMENTS

| CN | 110272027 A | 9/2019 |
|---|---|---|
| CN | 112320768 A | 2/2021 |
| TW | 201708100 A | 3/2017 |

OTHER PUBLICATIONS

Search Report appended to an Office Action, which was issued to Taiwanese counterpart application No. 110118131 by the TIPO dated Oct. 13, 2021, with an English translation thereof (2 pages).

* cited by examiner

*Primary Examiner* — Sheng H Davis
(74) *Attorney, Agent, or Firm* — Hamre, Schumann, Mueller & Larson, P.C.

(57) ABSTRACT

A method for preparing an electronic grade sulfuric acid from a waste sulfuric acid solution includes the steps of: performing, in sequence, a concentration treatment, a cracking treatment, and a purification treatment; performing a first oxidation treatment on sulfur dioxide; performing a first absorption treatment and a second oxidization treatment; performing an evaporation treatment; performing a first removal treatment on an acid mist containing metal ions and anion impurities; performing a second absorption treatment; and performing a second removal treatment on residual sulfur dioxide.

7 Claims, No Drawings

METHOD FOR PREPARING ELECTRONIC GRADE SULFURIC ACID FROM WASTE SULFURIC ACID SOLUTION

CROSS-REFERENCE TO RELATED APPLICATION

This application claims priority of Taiwanese Invention Patent Application No. 110118131, filed on May 19, 2021.

FIELD

The present disclosure relates to a method for preparing sulfuric acid from a waste sulfuric acid solution, and more particularly to a method for preparing an electronic grade sulfuric acid from the waste sulfuric acid solution.

BACKGROUND

In the current practice of semiconductor industry, a large amount of a solution containing a mixture of an electronic grade sulfuric acid and hydrogen peroxide is used for removing residue of photoresists and other organic substances remaining on a surface of a silicon wafer during manufacturing process thereof, resulting in generation of a large amount of a waste sulfuric acid solution, which would cause pollution and harm to the environment if the waste sulfuric acid solution is directly discharged without proper treatment. In addition, with the vigorous development of the semiconductor industry, use of the electronic grade sulfuric acid would also increase, indicating that a large amount of the waste sulfuric acid solution would be continuously generated. Therefore, how to effectively recycle the waste sulfuric acid solution generated from the semiconductor industry is an important issue to be solved.

SUMMARY

The present disclosure provides a method for preparing an electronic grade sulfuric acid from a waste sulfuric acid solution, which can alleviate the drawbacks of the prior art, and which includes the steps of:

(A) subjecting a waste sulfuric acid solution to a concentration treatment so as to obtain a concentrated waste sulfuric acid solution including sulfuric acid that is present in an amount ranging from 80 wt % to 90 wt % based on a total weight of the concentrated waste sulfuric acid solution, the concentrated waste sulfuric acid solution is then subjected to a cracking treatment performed at a temperature ranging from 1000° C. to 1200° C. for 1.5 seconds to 3.5 seconds so as to obtain a gas mixture containing sulfur dioxide gas, oxygen gas, and water vapor, followed by subjecting the mixture to a purification treatment in which the mixture was cooled from the temperature ranging from 1000° C. to 1200° C. and to a lower temperature ranging from 300° C. to 400° C., and then purified and further cooled to an even lower temperature of not greater than 40° C. so as to obtain a pure sulfur dioxide gas;

(B) subjecting the pure sulfur dioxide gas to a first oxidation treatment in the presence of vanadium pentoxide so as to obtain a gas substance containing sulfur trioxide gas and residual sulfur dioxide gas;

(C) performing a first absorption treatment in which a first oleum is used to absorb the sulfur trioxide gas and the residual sulfur dioxide gas of the gas substance so as to obtain a second oleum, and then performing a second oxidization treatment in which the residual sulfur dioxide gas in the second oleum are oxidized to sulfur trioxide using an oxidizing agent selected from at least one of hydrogen peroxide, sodium persulfate, and ozone so as to obtain a third oleum, a concentration of sulfur trioxide in each of the second oleum and the third oleum being greater than that of the first oleum, wherein the second oleum includes sulfur trioxide that is present in an amount ranging from 25 wt % to 40 wt % based on a total weight of the second oleum, and sulfur dioxide having a concentration ranging from 5 ppm to 50 ppm, the third oleum includes sulfur trioxide that is present in an amount ranging from 25 wt % to 40 wt % based on a total weight of the third oleum, and sulfur dioxide having a concentration ranging from 0 ppm to 0.5 ppm;

(D) subjecting the third oleum to an evaporation treatment at a temperature ranging from 130° C. to 150° C. for extracting sulfur trioxide gas therefrom, so as to obtain a first purified sulfur trioxide gas;

(E) performing, in a demisting apparatus, a first removal treatment in which an acid mist containing metal ions and anion impurities entrained by the first purified sulfur trioxide gas was removed so as to obtain a second purified sulfur trioxide gas having a purity higher than that of the first purified sulfur trioxide gas, the demisting apparatus including at least two demister units connected in sequence, each of the demister units including a filler unit which has a support frame and a filler material filled in the support frame, the support frame being made of at least one material selected from the group consisting of perfluoroalkoxy vinyl ether copolymer and modified polytetrafluoroethylene, the filler material being made of a material selected from the group consisting of perfluoroalkoxy vinyl ether copolymer and modified polytetrafluoroethylene;

(F) performing a second absorption treatment in which a first electronic grade sulfuric acid is used to absorb the second purified sulfur trioxide gas so as to obtain a second electronic grade sulfuric acid having a concentration higher than that of the first electronic grade sulfuric acid; and (G) performing a second removal treatment in which residual sulfur dioxide in the second electronic grade sulfuric acid is removed so as to obtain a third electronic grade sulfuric acid having a concentration higher than that of the second electronic grade sulfuric acid.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which this disclosure belongs. One skilled in the art will recognize many methods and materials similar or equivalent to those described herein, which could be used in the practice of this disclosure. Indeed, this disclosure is in no way limited to the methods and materials described.

The present disclosure provides a method for preparing an electronic grade sulfuric acid, which is a way of regenerating (i.e., recycling) a waste sulfuric acid solution produced in a semiconductor manufacturing process into the electronic grade sulfuric acid having a high purity.

As used herein, the term "waste sulfuric acid solution" refers to sulfuric acid containing-waste liquid produced in the semiconductor manufacturing process. In addition to sulfuric acid and water, the waste sulfuric acid solution may contain chemicals used in the semiconductor manufacturing process and residues thereof, such as, but not limited to, hydrogen peroxide and residues of photoresist. The waste sulfuric acid solution may have an amount of sulfuric acid that is similar to the amount of sulfuric acid present in the waste sulfuric acid solution produced a general semiconductor manufacturing process, for example, the amount of sulfuric acid may range from 40 wt % to 75%, but is not limited thereto.

A first embodiment of the method for preparing an electronic grade sulfuric acid of the present disclosure includes steps (A) to (G).

In step (A), the waste sulfuric acid solution is subjected to a concentration treatment, a cracking treatment, and a purification treatment performed sequentially so as to obtain a pure sulfur dioxide gas.

The concentration treatment includes concentrating the waste sulfuric acid solution in a vacuum environment so as to obtain a concentrated waste sulfuric acid solution that includes sulfuric acid present in an amount higher than that of the sulfuric acid in the waste sulfuric acid solution. For example, if the waste sulfuric acid solution includes sulfuric acid present in an amount ranging from 40 wt % to 75 wt %, the concentrated waste sulfuric acid solution may include sulfuric acid present in an amount ranging from 80 wt % to 90 wt %. The waste sulfuric acid solution may be concentrated by, for example, but not limited to, heating and evaporating the waste sulfuric acid solution in a vacuum environment using a vacuum evaporation apparatus. Hydrogen peroxide vapor and water vapor produced by the concentration treatment are introduced into a condensing device to be subjected to a condensation treatment so as to form an aqueous hydrogen peroxide solution.

The cracking treatment includes subjecting the concentrated waste sulfuric acid solution to an atomizing process in an atomizer to form micro mist droplets, followed by the cracking reaction at a temperature ranging from 1000° C. to 1200° C. for 1.5 seconds to 3.5 seconds so as to obtain a gas mixture containing sulfur dioxide gas, oxygen gas, and water vapor. The atomizing process of the concentrated waste sulfuric acid solution may be performed using, for example, but not limited to, a double-fluid atomizing spray nozzle under an air pressure ranging from 0.3 MPa to 0.6 MPa, such that the concentrated waste sulfuric acid solution is atomized to form micro mist droplets. The cracking reaction may be performed by, for example, but not limited to, introducing the micro mist droplets into a cracking furnace and then feeding natural gas or sulfur into the cracking furnace to be mixed and burnt with air so as to generate heat energy required for the cracking reaction.

The purification treatment includes cooling the gas mixture from the temperature ranging from 1000° C. to 1200° C. to a lower temperature ranging from 300° C. to 400° C., and then purifying and further cooling the gas mixture to an even lower temperature of not greater than 40° C. so as to obtain a pure sulfur dioxide gas. The gas mixture may be cooled from the temperature ranging from 1000° C. to 1200° C. to the lower temperature ranging from 300° C. to 400° C. using, for example, but not limited to, a waste heat boiler such that a high temperature heat energy of the gas mixture is recovered to produce steam so as to cool the gas mixture. The gas mixture may be purified and further cooled to the even lower temperature of not greater than 40° C. by, for example, but not limited to, introducing the gas mixture cooled to the temperature ranging from 300° C. to 400° C. into a reverse spray scrubber tower to permit the gas mixture to be further cooled and to permit uncracked concentrated waste sulfuric acid solution, incompletely cracked sulfur trioxide gas, fire clays falling off from the cracking furnace and other substances to be removed, so as to obtain the pure sulfur dioxide gas.

In step (B), the pure sulfur dioxide gas is subjected to a first oxidation treatment in the presence of a catalyst so as to obtain a gas substance containing sulfur trioxide gas and residual sulfur dioxide gas. In certain embodiments, the pure sulfur dioxide gas is introduced into a catalytic reaction tower filled with the catalyst, and then air is introduced into the catalytic reaction tower, so that the pure sulfur dioxide gas is oxidized into sulfur trioxide gas. The catalyst may be a catalyst that is generally used to convert sulfur dioxide into sulfur trioxide, for example, but not limited to, vanadium pentoxide.

In step (C), a first absorption treatment is performed in which a first oleum is used to absorb the sulfur trioxide gas and the residual sulfur dioxide gas of the gas substance so as to obtain a second oleum, and then a second oxidization treatment is performed in which the residual sulfur dioxide gas in the second oleum is oxidized to sulfur trioxide using an oxidizing agent so as to obtain a third oleum. A concentration of sulfur trioxide in each of the second oleum and the third oleum is greater than that of the first oleum. In certain embodiments, step (C) is performed in an absorption tower filled with the first oleum, and the oxidizing agent selected from at least one of hydrogen peroxide, sodium persulfate and ozone is added such that the residual sulfur dioxide gas in the second oleum is sufficiently oxidized into sulfur trioxide. Moreover, a waste gas generated in the first absorption treatment would be fed into a waste gas absorption tower so as to recover sulfur trioxide in the waste gas. As used herein, the terms "first oleum", "second oleum", and "third oleum" intend to indicate difference in the concentration of sulfur trioxide in each thereof. The concentration of sulfur trioxide in each of the first oleum, the second oleum and the third oleum is not particularly limited. For example, the second oleum includes sulfur trioxide that is present in an amount ranging from 25 wt % to 40 wt % based on a total weight of the second oleum, and sulfur dioxide having a concentration ranging from 5 ppm to 50 ppm, whereas the third oleum includes sulfur trioxide that is present in an amount ranging from 25 wt % to 40 wt % based on a total weight of the third oleum, and sulfur dioxide having a concentration ranging from 0 ppm to 0.5 ppm, but is not limited thereto.

In step (D), the third oleum is subjected to an evaporation treatment at a temperature ranging of 130° C. to 150° C. for evaporating sulfur trioxide gas therefrom, so as to obtain a first purified sulfur trioxide gas. The evaporation treatment may be performed by, for example, but not limited to, introducing the third oleum into an evaporator, such as a rising film evaporator, a falling film evaporator, etc., through a preheating apparatus. In addition, if deemed necessary, the third oleum remaining after the evaporation treatment is returned to the absorption tower via the preheating apparatus. It should be noted that, by controlling the temperature of the evaporation treatment to range from 130° C. to 150° C., the evaporator may be prevented from being corroded by acid, thereby avoiding metal dissolution.

In step (E), in a demisting apparatus, a first removal treatment is performed in which the acid mist containing metal ions and anion impurities entrained by the first purified sulfur trioxide gas was removed so as to obtain a second purified sulfur trioxide gas having a purity higher than that of the first purified sulfur trioxide gas.

The demisting apparatus includes at least two demister units connected in sequence. Each of the demister units includes a filler unit which has a support frame and a filler material filled in the support frame. The support frame is made of at least one material selected from the group consisting of perfluoroalkoxy vinyl ether copolymer and modified polytetrafluoroethylene. The filler material is made of a material selected from the group consisting of perfluoroalkoxy vinyl ether copolymer and modified polytetrafluoroethylene. The filler material of the filler unit of one of the demister unit may be the same or different from the filler material of the filler unit of the other one of the demister unit. In certain embodiments, the filler material has a shape of one of a wire mesh or a three-dimensional honeycomb, and a specific surface area ranging from 200 $m^2/m^3$ to 2000 $m^2/m^3$.

In step (F), a second absorption treatment is performed in which a first electronic grade sulfuric acid is used to absorb the second purified sulfur trioxide gas so as to obtain a second electronic grade sulfuric acid having a concentration higher than that of the first electronic grade sulfuric acid. In certain embodiments, step (F) is performed in the absorption tower filled with first electronic grade sulfuric acid.

In step (G), a second removal treatment is performed in which residual sulfur dioxide in the second electronic grade sulfuric acid is removed so as to obtain a third electronic grade sulfuric acid having a concentration higher than that of the second electronic grade sulfuric acid. In the first embodiment, the second electronic grade sulfuric acid is subjected to concentration adjustment thereof using ultrapure water, and then subjected to a cooling process, followed by removal of the sulfur dioxide residues using a clean dry compressed air that is free from oil and dust, so as to obtain the third electronic grade sulfuric acid.

A second embodiment of the method for preparing the electronic grade sulfuric acid of the present disclosure is substantially similar to the first embodiment, except that in step (G), the residual sulfur dioxide in the second electronic grade sulfuric acid is oxidized by using an electronic grade hydrogen peroxide, followed by performing a filtration treatment, so as to obtain the third electronic grade sulfuric acid. The filtration treatment is performed using a filter assembly including at least three filter elements connected in sequence. Each of the filter elements has a pore size ranging from 0.003 μm to 0.1 μm. The filter element is made of at least one material selected from the group consisting of perfluoroalkoxy vinyl ether copolymer and modified polytetrafluoroethylene.

The present disclosure will be further described by way of the following examples. However, it should be understood that the following examples are intended solely for the purpose of illustration and should not be construed as limiting the present disclosure in practice.

Examples 1 to 3 (EX1 to EX3)

Each of the methods of EX1 to EX3 are performed by subjecting a waste sulfuric acid solution to steps (A) to (G) of the first embodiment of the method for preparing an electronic grade sulfuric acid of the present disclosure as described in the foregoing, so as to obtain a third electronic grade sulfuric acid. The procedures and conditions for performing the methods of EX1 to EX3 are shown in Table 1 below.

Property Evaluation

The parameters of intermediates and/or products obtained in certain steps of the methods of EX1 to EX3 are subjected to the following evaluations.

1. Sulfuric acid content and hydrogen peroxide content in waste sulfuric acid solution and concentrated waste sulfuric acid solution The waste sulfuric acid solution and the concentrated waste sulfuric acid solution were subjected to measurement of sulfuric acid content and hydrogen peroxide content therein using an automatic titrator (Manufacturer: Metrohm AG; Model no.: 848 Titrino plus). The results are shown in Table 1.

2. Total content of organic carbon in waste sulfuric acid solution and concentrated waste sulfuric acid solution The waste sulfuric acid solution and the concentrated waste sulfuric acid solution were subjected to measurement of total content of organic carbon using a total organic carbon analyzer (Manufacturer: Shimadzu Corporation; Model no: TOC-L series). The results are shown in Table 1.

3. Water content in waste sulfuric acid solution and concentrated waste sulfuric acid solution The sulfuric acid content, the hydrogen peroxide content, and the total content of organic carbon as determined in Items 1 and 2 above were deducted from a total weight of the waste sulfuric acid solution, so as to determine the water content in the waste sulfuric acid solution. The water content in the concentrated waste sulfuric acid solution was determined using procedures similar to those described for the waste sulfuric acid solution. The results are shown in Table 1.

4. Oxygen content in sulfur dioxide gas-containing mixed vapor

The oxygen content in the sulfur dioxide gas-containing mixed vapor was directly measured in-situ using an oxygen analyzer (Manufacturer: ABB; Model no.: Zirconia in-situ oxygen analyzer). The results are shown in Table 1.

5. Recovery rate of sulfur in purification treatment in step (A)

The recovery rate of sulfur in the purification treatment in step (A) was calculated using the following Equation (I):

Recovery rate of sulfur=(sulfur content in the waste sulfuric acid solution−sulfur content in waste water generated in the purification treatment)÷(sulfur content in the waste sulfuric acid solution)×100%  (I)

The results are shown in Table 1.

6. Conversion rate of sulfur dioxide gas in step B

The conversion rate of sulfur dioxide gas in step (B) was calculated using the following Equation (II):

Conversion rate of sulfur dioxide gas=(pure sulfur dioxide gas content−residual sulfur dioxide gas content in the sulfur trioxide gas-containing gas substance)÷(pure sulfur dioxide gas content)×100%  (II)

The results are shown in Table 1.

7. Absorption rate of sulfur trioxide gas in step C

The absorption rate of sulfur trioxide gas in step (C) was calculated using the following Equation (III):

Absorption rate of sulfur trioxide gas=(sulfur trioxide gas content in the sulfur trioxide gas-containing gas substance−sulfur trioxide gas content in exhaust gas)÷(sulfur trioxide gas content in the sulfur trioxide gas-containing gas substance)×100%  (III)

The results are shown in Table 1.

8. Concentration of third electronic grade sulfuric acid

The purity of the third electronic grade sulfuric acid was determined using an automatic titrator (Manufacturer: Metrohm AG; Model no.: 848 Titrino plus) according to the procedures set forth in Japanese Industrial Standards (JIS) K9905 Highly Purified Sulfuric Acid (published in 1995 by the Japanese Standards Association). The results are shown in Table 1.

9. Chromaticity of third electronic grade sulfuric acid

The chromaticity of the third electronic grade sulfuric acid was determined using a colorimeter with standardized chromaticity according to the procedures set forth in Semiconductor Equipment and Materials international (SEMI) C1-0310 Guide for the Analysis in Liquid Chemicals (published in 2010). The results are shown in Table 2.

10. Ignition residue content in third electronic grade sulfuric acid

The ignition residue content in the third electronic grade sulfuric acid was determined using a high temperature furnace and a precision balance (Manufacturer: Shimadzu Corporation; Model no.: AUX-220) according to the procedures set forth in Japanese Industrial Standards (JIS) K9905 Highly Purified Sulfuric Acid (published in 1995 by the Japanese Standards Association). The results are shown in Table 2.

11. Reduced substance content in third electronic grade sulfuric acid

The reduced substance content in the third electronic grade sulfuric acid was determined by using potassium permanganate to perform redox titration and then utilizing the molecular weight of sulfur dioxide as a basis for calculation according to the procedures set forth in Japanese Industrial Standards (JIS) K9905 Highly Purified Sulfuric Acid (published in 1995 by the Japanese Standards Association). The results are shown in Table 2.

12. Ammonium ion ($NH_4^+$) content in third electronic grade sulfuric acid

The ammonium ion content in the third electronic grade sulfuric acid was determined according to the procedures set forth in Japanese Industrial Standards (JIS) K9905 Highly Purified Sulfuric Acid (published in 1995 by the Japanese Standards Association). The results are shown in Table 2. To be specific, a respective one of a plurality of electronic grade sulfuric acids (serving as standards) each having a known ammonium ion content therein was reacted with a reacting agent, and then absorbance of each of the reacted electronic grade sulfuric acid was measured using a ultraviolet-visible spectrophotometry (Manufacturer: Shimadzu Corporation; Model no.: UV-2600), followed by generating a calibration curve based on the absorbance and the known ammonium ion content of each of the reacted electronic grade sulfuric acids, so as to obtain a linear equation. Thereafter, the reacting agent was subjected to a reaction with the ammonium ions in the third electronic grade sulfuric acid so as to obtain a test solution. Subsequently, the absorbance of the test solution was measured using the ultraviolet-visible spectrophotometry, followed by using the linear equation to calculate the ammonium ion content in the third electronic grade sulfuric acid.

13. Chloride ion ($Cl^-$) content in third electronic grade sulfuric acid

The chloride ion content in the third electronic grade sulfuric acid was determined according to the procedures set forth in Japanese Industrial Standards (JIS) K9905 Highly Purified Sulfuric Acid (published in 1995 by the Japanese Standards Association). The results are shown in Table 2. To be specific, a respective one of a plurality of electronic grade sulfuric acids (serving as standards) each having a known chloride ion content therein was reacted with a reacting agent, and then turbidity of each of the reacted electronic grade sulfuric acid was measured using a turbidimeter (Manufacturer: Hach Co.; Model no.: TL-2350 EPA), followed by generating a calibration curve based on the turbidity and the known chloride ion content of each of the reacted electronic grade sulfuric acids, so as to obtain a linear equation. Thereafter, the reacting agent was subjected to a reaction with the chloride ions in the third electronic grade sulfuric acid so as to obtain a test solution. Subsequently, the turbidity of the test solution was measured using the turbidimeter, followed by using the linear equation to calculate the chloride ion content in the third electronic grade sulfuric acid.

14. Nitrate ion ($NO_3^-$) content in third electronic grade sulfuric acid

The nitrate ion content in the third electronic grade sulfuric acid was determined according to the procedures set forth in Japanese Industrial Standards (JIS) K9905 Highly Purified Sulfuric Acid (published in 1995 by the Japanese Standards Association). The results are shown in Table 2. To be specific, the absorbance of a respective one of a plurality of electronic grade sulfuric acids (serving as standards) each having a known nitrate ion content therein was measured using a ultraviolet-visible spectrophotometry (Manufacturer: Shimadzu Corporation; Model no.: UV-2600), and then a calibration curve based on the absorbance and the known nitrate ion content of each of the electronic grade sulfuric acids was generated, so as to obtain a linear equation. Thereafter, the absorbance of the third electronic grade sulfuric acid was measured using the ultraviolet-visible spectrophotometry, followed by using the linear equation to calculate the nitrate ion content in the third electronic grade sulfuric acid.

15. Phosphate ion ($PO_4^{3-}$) content in third electronic grade sulfuric acid

The phosphate ion content in the third electronic grade sulfuric acid was determined according to the procedures set forth in Japanese Industrial Standards (JIS) K9905 Highly Purified Sulfuric Acid (published in 1995 by the Japanese Standards Association). The results are shown in Table 2. To be specific, a respective one of a plurality of electronic grade sulfuric acids (serving as standards) each having a known phosphate ion content therein was reacted with a reacting agent, and then absorbance of each of the reacted electronic grade sulfuric acid was measured using a ultraviolet-visible spectrophotometry (Manufacturer: Shimadzu Corporation; Model no.: UV-2600), followed by generating a calibration curve based on the absorbance and the known phosphate ion content of each of the reacted electronic grade sulfuric acids, so as to obtain a linear equation. Thereafter, the reacting agent was subjected to a reaction with the phosphate ions in the third electronic grade sulfuric acid so as to obtain a test solution. Subsequently, the absorbance of the test solution was measured using the ultraviolet-visible spectrophotometry, followed by using the linear equation to calculate the phosphate ion content in the third electronic grade sulfuric acid.

16. Total content of organic carbon in third electronic grade sulfuric acid

The total content of organic carbon in the third electronic grade sulfuric acid was determined by non-dispersive infrared spectroscopy using a total organic carbon analyzer (Manufacturer: Shimadzu Corporation; Model no: TOC-L series) under conditions of catalytic oxidation and a high temperature. The results are shown in Table 2.

17. Metal ion content in third electronic grade sulfuric acid

The content of each metal ions in the third electronic grade sulfuric acid was determined using an inductively coupled plasma mass spectrometer (ICP-MS) (Manufacturer: Agilent Technologies, Inc; Model no.: Triple Quadrupole 8900). The results are shown in Table 2.

Results:

TABLE 1

| | Property evaluation | EX1 | EX2 | EX3 |
|---|---|---|---|---|
| Waste sulfuric acid solution | Sulfuric acid (wt %) | 50.20 | 60.70 | 65.2 |
| | Hydrogen peroxide (wt %) | 5.10 | 6.10 | 9.30 |
| | Water (wt %) | 44.60 | 33.09 | 25.42 |
| | Total organic carbon content (wt %) | 0.10 | 0.11 | 0.08 |

TABLE 1-continued

| | Property evaluation | EX1 | EX2 | EX3 |
|---|---|---|---|---|
| Concentrated waste sulfuric acid solution | Sulfuric acid (wt %) | 85.80 | 86.10 | 87.80 |
| | Hydrogen peroxide (wt %) | 0.08 | 0.07 | 0.06 |
| | Water (wt %) | 13.95 | 13.67 | 12.03 |
| | Total organic carbon content (wt %) | 0.17 | 0.16 | 0.11 |
| Cracking temperature (° C.) | | 1050 | 1060 | 1100 |
| Oxygen content in mixed vapor containing sulfur dioxide gas (mol %) | | ≥2.5 | ≥3.0 | ≥3.5 |
| Recovery rate of sulfur after purification treatment (%) | | ≥98.0 | ≥98.5 | ≥99.0 |
| Conversion rate of sulfur dioxide (%) | | ≥99.85 | ≥99.85 | ≥99.85 |
| Absorption rate of sulfur trioxide (%) | | ≥99.95 | ≥99.95 | ≥99.95 |
| Concentration of third electronic grade sulfuric acid (%) | | 96.51 | 96.35 | 96.48 |

As shown in Table 1, the methods for preparing the third electronic grade sulfuric acids of EX1 to EX3 have a sulfur dioxide conversion rate of greater than 99.85% and a sulfur trioxide absorption rate of greater than 99.95%, indicating that the method for preparing the electronic grade sulfuric acid of the present disclosure can effectively convert sulfur dioxide into sulfur trioxide, and after the sulfur trioxide is effectively absorbed by the first oleum in step (C), followed by performing steps (D) to (G), is capable of producing the third electronic grade sulfuric acid having a concentration of greater than 96%.

TABLE 2

| | | | Standard | Third electronic grade sulfuric acid | | |
|---|---|---|---|---|---|---|
| | | Unit | amount | EX1 | EX2 | EX3 |
| | Chromaticity | APHA | ≤10 | ≤5 | ≤5 | ≤5 |
| | Ignition residue content | ppm | ≤1.0 | ≤0.5 | ≤0.5 | ≤0.5 |
| | Reduced substance content | ppm | ≤1.0 | ≤0.5 | ≤0.5 | ≤0.5 |
| | Ammonium ion ($NH_4^+$) content | ppm | ≤1.0 | ≤0.5 | ≤0.5 | ≤0.5 |
| | Chloride ion ($Cl^-$) content | ppm | ≤0.1 | ≤0.02 | ≤0.02 | ≤0.02 |
| | Nitrate ion ($NO_3^-$) content | ppm | ≤0.1 | ≤0.05 | ≤0.05 | ≤0.05 |
| | Phosphate ion ($PO_4^{3-}$) content | ppm | ≤0.1 | ≤0.05 | ≤0.05 | ≤0.05 |
| | Total organic carbon content | ppm | ≤0.5 | ≤0.2 | ≤0.2 | ≤0.2 |
| Metal ion content | Aluminum (Al) | ppb | ≤0.03 | ≤0.01 | ≤0.01 | ≤0.005 |
| | Antimony (Sb) | ppb | ≤0.01 | ≤0.005 | ≤0.005 | ≤0.005 |
| | Arsenic (As) | ppb | ≤0.01 | ≤0.005 | ≤0.005 | ≤0.005 |
| | Barium (Ba) | ppb | ≤0.01 | ≤0.005 | ≤0.005 | ≤0.005 |
| | Beryllium (Be) | ppb | ≤0.01 | ≤0.005 | ≤0.005 | ≤0.005 |
| | Bismuth (Bi) | ppb | ≤0.01 | ≤0.005 | ≤0.005 | ≤0.005 |
| | Boron (B) | ppb | ≤0.5 | ≤0.2 | ≤0.1 | ≤0.05 |
| | Cadmium (Cd) | ppb | ≤0.01 | ≤0.005 | ≤0.005 | ≤0.005 |
| | Calcium (Ca) | ppb | ≤0.02 | ≤0.01 | ≤0.01 | ≤0.005 |
| | Chromium (Cr) | ppb | ≤0.02 | ≤0.01 | ≤0.005 | ≤0.005 |
| | Cobalt (Co) | ppb | ≤0.01 | ≤0.005 | ≤0.005 | ≤0.005 |
| | Copper (Cu) | ppb | ≤0.01 | ≤0.005 | ≤0.005 | ≤0.005 |
| | Gallium (Ga) | ppb | ≤0.01 | ≤0.005 | ≤0.005 | ≤0.005 |
| | Germanium (Ge) | ppb | ≤0.01 | ≤0.005 | ≤0.005 | ≤0.005 |
| | Gold (Au) | ppb | ≤0.01 | ≤0.005 | ≤0.005 | ≤0.005 |
| | Iron (Fe) | ppb | ≤0.03 | ≤0.02 | ≤0.01 | ≤0.005 |
| | Lead (Pb) | ppb | ≤0.01 | ≤0.005 | ≤0.005 | ≤0.005 |
| | Lithium (Li) | ppb | ≤0.005 | ≤0.005 | ≤0.005 | ≤0.005 |
| | Magnesium (Mg) | ppb | ≤0.03 | ≤0.01 | ≤0.005 | ≤0.005 |
| | Manganese (Mn) | ppb | ≤0.01 | ≤0.005 | ≤0.005 | ≤0.005 |
| | Molybdenum (Mo) | ppb | ≤0.01 | ≤0.005 | ≤0.005 | ≤0.005 |
| | Nickel (Ni) | ppb | ≤0.02 | ≤0.01 | ≤0.005 | ≤0.005 |
| | Niobium (Nb) | ppb | ≤0.01 | ≤0.005 | ≤0.005 | ≤0.005 |
| | Potassium (K) | ppb | ≤0.03 | ≤0.02 | ≤0.01 | ≤0.005 |
| | Selenium (Se) | ppb | ≤0.01 | ≤0.005 | ≤0.005 | ≤0.005 |
| | Silver (Ag) | ppb | ≤0.01 | ≤0.005 | ≤0.005 | ≤0.005 |
| | Sodium (Na) | ppb | ≤0.03 | ≤0.02 | ≤0.01 | ≤0.005 |
| | Strontium (Sr) | ppb | ≤0.01 | ≤0.005 | ≤0.005 | ≤0.005 |
| | Tantalum (Ta) | ppb | ≤0.01 | ≤0.005 | ≤0.005 | ≤0.005 |
| | Thallium (Tl) | ppb | ≤0.01 | ≤0.005 | ≤0.005 | ≤0.005 |
| | Tin (Sn) | ppb | ≤0.01 | ≤0.005 | ≤0.005 | ≤0.005 |

TABLE 2-continued

| | Unit | Standard amount | Third electronic grade sulfuric acid | | |
|---|---|---|---|---|---|
| | | | EX1 | EX2 | EX3 |
| Titanium (Ti) | ppb | ≤0.03 | ≤0.01 | ≤0.01 | ≤0.005 |
| Tungsten (W) | ppb | ≤0.01 | ≤0.005 | ≤0.005 | ≤0.005 |
| Vanadium (V) | ppb | ≤0.01 | ≤0.005 | ≤0.005 | ≤0.005 |
| Zinc (Zn) | ppb | ≤0.01 | ≤0.005 | ≤0.005 | ≤0.005 |
| Zirconium (Zr) | ppb | ≤0.01 | ≤0.005 | ≤0.005 | ≤0.005 |

As shown in Table 2, the content of each of the metal ions in the third electronic grade sulfuric acids of EX1 to EX3 is less than 5 parts-per-trillion (ppt). It should be noted that, according to industrial standards currently used for classifying an electronic grade sulfuric acid based on purity, the electronic grade sulfuric acid is of the highest purity when the content of metal ions therein is less than 10 ppt, and such electronic grade sulfuric acid is particularly suitable for semiconductor manufacturing processes having a line width of less than 10 nm. Therefore, the third electronic grade sulfuric acids of EX1 to EX3 meets the industrial standards to be classified as the electronic grade sulfuric acid of the highest purity based on the content of the metal ions therein.

In summary, by performing steps (A) to (G), in particular step (E) that utilizes at least two demister units which is connected in sequence and each of which includes the filler unit filled with the filler material made of a specified material, the method for preparing the electronic grade sulfuric acid of the present disclosure is capable of effectively regenerating the waste sulfuric acid solution so as to obtain the electronic grade sulfuric acid with high purity, and such electronic grade sulfuric acid is particularly suitable for semiconductor manufacturing processes.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for preparing high-purity electronic grade sulfuric acid from a waste sulfuric acid solution, comprising the following steps:

(S1) subjecting a waste sulfuric acid solution to a concentration treatment so as to obtain a concentrated waste sulfuric acid solution including sulfuric acid that is present in an amount ranging from 80 wt % to 90 wt %, the concentrated waste sulfuric acid solution is then subjected to a cracking treatment performed at a temperature ranging from 1000° C. to 1200° C. for 1.5 seconds to 3.5 seconds so as to obtain a gas mixture containing sulfur dioxide gas, oxygen gas, and water vapor, followed by subjecting the gas mixture to a purification treatment in which the gas mixture was cooled from the temperature ranging from 1000° C. to 1200° C. to a lower temperature ranging from 300° C. to 400° C., and then purified and further cooled to an even lower temperature of not greater than 40° C. so as to obtain a pure sulfur dioxide gas;

(S2) oxidizing the pure sulfur dioxide gas in the presence of vanadium pentoxide so as to obtain a gas product containing sulfur trioxide gas;

(S3) absorbing the sulfur trioxide gas and the residual pure sulfur dioxide gas in the gas product containing the sulfur trioxide gas using an oleum having a first concentration so as to obtain an oleum having a second concentration, and then oxidizing the residual pure sulfur dioxide gas in the oleum having the second concentration using an oxidizing agent selected from the group consisting of hydrogen peroxide, sodium persulfate, ozone, and combinations thereof, so as to obtain an oleum having a third concentration, a concentration of sulfur trioxide in the oleum having the second concentration and the oleum having the third concentration being greater than that of the oleum having the first concentration, wherein the oleum having the second concentration has a sulfur trioxide concentration ranging from 25 wt % to 40 wt % and a sulfur dioxide concentration ranging from 5 ppm to 50 ppm, and the oleum having the third concentration has a sulfur trioxide concentration ranging from 25 wt % to 40 wt % and a sulfur dioxide concentration ranging from 0 ppm to 0.5 ppm;

(S4) subjecting the oleum having the third concentration to evaporation at a temperature ranging from 130° C. to 150° C. for extracting sulfur trioxide gas therefrom, so as to obtain a sulfur trioxide gas having a first purity;

(S5) removing, using a demisting apparatus, an acid mist containing metal ions entrained by the sulfur trioxide gas having the first purity so as to obtain a sulfur trioxide gas having a second purity, a purity of sulfur trioxide in the sulfur trioxide gas having the second purity being greater than that in the sulfur trioxide gas having the first purity, the demisting apparatus including at least two types of demisters that are interconnected, each of the demisters including a filler unit that has a carrier frame and a filler filled in the carrier frame, a material of the carrier frame being selected from the group consisting of perfluoroalkoxy vinyl ether copolymer, modified polytetrafluoroethylene, and a combination thereof, a material of the filler being selected from the group consisting of perfluoroalkoxy vinyl ether copolymer and modified polytetrafluoroethylene;

(S6) absorb the sulfur trioxide gas having the second purity using an electronic grade sulfuric acid having a first purity so as to obtain an electronic grade sulfuric acid having a second purity, a concentration sulfuric acid in the electronic grade sulfuric acid having the second purity being greater than that in the electronic grade sulfuric acid having the first purity; and (S7) removing the residual sulfur dioxide from the electronic grade sulfuric acid having the second purity so as to obtain an electronic grade sulfuric acid having a third purity, a concentration of sulfuric acid in the electronic grade sulfuric acid having the third purity being greater than that in the electronic grade sulfuric acid having the second purity.

2. The method for preparing high-purity electronic grade sulfuric acid from the waste sulfuric acid solution according to claim 1, wherein in step (S5), the filler has a shape selected from the group consisting of a wire mesh and a three-dimensional honeycomb, and a specific surface area ranging from 200 $m^2/m^3$ and 2000 $m^2/m^3$.

3. The method for preparing high-purity electronic grade sulfuric acid from the waste sulfuric acid solution according to claim 1, wherein in step (S1), the concentration treatment includes concentrating the waste sulfuric acid solution in a vacuum environment.

4. The method for preparing high-purity electronic grade sulfuric acid from the waste sulfuric acid solution according to claim 3, wherein in step (S1), the concentrated waste sulfuric acid solution is atomized to form mist droplets, followed by being subjected to the cracking treatment.

5. The method for preparing high-purity electronic grade sulfuric acid from the waste sulfuric acid solution according to claim 1, wherein in step (S7), the electronic grade sulfuric acid having the second purity is subjected to concentration adjustment using ultrapure water, followed by cooling to a lower temperature, and then removal of sulfur dioxide using compressed dry air that is free of oil and dust, so as to obtain the electronic grade sulfuric acid having the third purity.

6. The method for preparing high-purity electronic grade sulfuric acid from the waste sulfuric acid solution according to claim 1, wherein in step (S7), the residual sulfur dioxide in the electronic grade sulfuric acid having the second purity is oxidized using an electronic grade hydrogen peroxide, followed by filtration, so as to obtain the electronic grade sulfuric acid having the third purity.

7. The method for preparing high-purity electronic grade sulfuric acid from the waste sulfuric acid solution according to claim 6, wherein in step (S7), the filtration is performed in a filter device including at least three types of filter elements which are interconnected in series, and each of the filter elements has a pore size ranging from 0.003 μm to 0.1 μm, a material of each filter element being selected from the group consisting of perfluoroalkoxy vinyl ether copolymer, modified polytetrafluoroethylene, and a combination thereof.

* * * * *